US009788647B2

(12) United States Patent
Joshi et al.

(10) Patent No.: US 9,788,647 B2
(45) Date of Patent: Oct. 17, 2017

(54) OVERBED TABLE

(71) Applicant: Nishan Joshi, Anaheim, CA (US)

(72) Inventors: Nishan Joshi, Anaheim, CA (US); Mike Neng Kuo Chen, Santa Ana, CA (US); Daniel Torres, Jr., Anaheim, CA (US)

(73) Assignee: Nishan Joshi, Anaheim, CA (US)

( * ) Notice: Subject to any disclaimer, the term of this patent is extended or adjusted under 35 U.S.C. 154(b) by 0 days.

(21) Appl. No.: 14/882,268

(22) Filed: Oct. 13, 2015

(65) Prior Publication Data

US 2017/0099943 A1 Apr. 13, 2017

(51) Int. Cl.
*A47B 85/00* (2006.01)
*A47B 23/04* (2006.01)
(Continued)

(52) U.S. Cl.
CPC .............. *A47B 23/046* (2013.01); *A47B 9/20* (2013.01); *A47B 11/00* (2013.01); *A47B 13/08* (2013.01);
(Continued)

(58) Field of Classification Search
CPC ......... A47B 23/046; A47B 9/20; A47B 11/00; A47B 13/08; B60B 33/0092
See application file for complete search history.

(56) References Cited

U.S. PATENT DOCUMENTS 3,618,145 A 11/1971 Rowe
3,963,288 A * 6/1976 Burnett .................... A47B 9/04
108/139
(Continued)

FOREIGN PATENT DOCUMENTS

CN 202445458 9/2012
CN 202941652 5/2013
(Continued)

OTHER PUBLICATIONS

International Search Report for corresponding application PCT/US2016/056796, dated Nov. 3, 2016.

*Primary Examiner* — Hanh V Tran
(74) *Attorney, Agent, or Firm* — Myers Andras LLP; Joseph C. Andras

(57) ABSTRACT

An overbed table may have a base support frame with at least three casters and a rechargeable battery. A motor housing with a top wall having an opening may be attached to the base support and a telescoping column that is hollow tubular is attached at a bottom end to the motor housing over the opening to extend upwardly. A linear motor is positioned in the motor housing with a linear motor actuator projecting through the opening and into the telescoping housing wherein an extension member of the linear motor actuator is attached at a top end to a slidable table column member of the telescoping housing. Servo housing is attached at a top end of the slidable table column member with a servomechanism attached in the servo housing positioned for a rotating shaft of the servomechanism to engage a circular bracket attached adjacent to a first end of a table wherein the circular bracket is rotatably engaged with the servo housing. The rechargeable battery is in electrical communication with a control processor of a control panel attached adjacent the first end of the table, to the linear motor and to the servomechanism.

8 Claims, 4 Drawing Sheets

(51) Int. Cl.
   *A47B 9/20* (2006.01)
   *A47B 11/00* (2006.01)
   *A47B 13/08* (2006.01)
   *B60B 33/00* (2006.01)
   *B60B 33/02* (2006.01)
   *A61G 7/05* (2006.01)
   *A61G 12/00* (2006.01)

(52) U.S. Cl.
   CPC ........ *B60B 33/0092* (2013.01); *B60B 33/021* (2013.01); *B60B 33/026* (2013.01); *A47B 2023/047* (2013.01); *A61G 7/05* (2013.01); *A61G 12/00* (2013.01)

(56) References Cited

U.S. PATENT DOCUMENTS

| | | | |
|---|---|---|---|
| 4,077,333 A | 3/1978 | Ballas | |
| 5,323,695 A * | 6/1994 | Borgman | A47B 9/00 108/147 |
| 5,473,997 A * | 12/1995 | Solomon | A47B 23/046 108/49 |
| 5,696,574 A * | 12/1997 | Schwaegerle | A61B 3/18 108/139 |
| 5,884,882 A * | 3/1999 | Nada | A47B 21/00 108/147 |
| 5,915,659 A | 6/1999 | Scannell, Jr. | |
| 6,269,753 B1 * | 8/2001 | Roddan | A47B 21/00 108/50.01 |
| 6,536,357 B1 | 3/2003 | Hiestand | |
| 6,543,369 B1 * | 4/2003 | Swensson | A47B 23/046 108/103 |
| 6,721,178 B1 | 4/2004 | Clark et al. | |
| 6,739,653 B1 | 5/2004 | Hoekstra et al. | |
| 7,467,433 B2 | 12/2008 | Wong | |
| D588,829 S | 3/2009 | Rheault et al. | |
| 7,540,243 B2 | 6/2009 | George et al. | |
| 7,612,999 B2 * | 11/2009 | Clark | A61B 5/0002 248/918 |
| 7,861,440 B2 | 1/2011 | Ma et al. | |
| 8,056,489 B2 | 11/2011 | Nielsen | |
| 8,082,857 B2 | 12/2011 | George et al. | |
| 8,100,061 B2 | 1/2012 | Hookway et al. | |
| 8,180,485 B2 * | 5/2012 | Reckelhoff | A61G 12/001 700/237 |
| 8,316,777 B1 | 11/2012 | Rosing | |
| 8,812,153 B2 | 8/2014 | Reckelhoff | |
| 8,826,830 B2 | 9/2014 | Pajic | |
| 8,839,725 B2 | 9/2014 | Kooistra et al. | |
| 8,840,175 B2 | 9/2014 | Short | |
| 2003/0052787 A1 * | 3/2003 | Zerhusen | A47B 23/046 340/573.1 |
| 2005/0016806 A1 * | 1/2005 | Klinke | A47B 9/20 188/371 |
| 2005/0132935 A1 * | 6/2005 | Lahmann | A47B 23/00 108/49 |
| 2005/0252429 A1 | 11/2005 | Logan et al. | |
| 2006/0137091 A1 * | 6/2006 | Gramkow | A61G 7/1015 5/86.1 |
| 2008/0121150 A1 | 5/2008 | Picchio | |
| 2009/0101047 A1 * | 4/2009 | Mulaw | A47B 5/00 108/13 |
| 2009/0241807 A1 * | 10/2009 | George | A61B 5/0002 108/50.02 |
| 2009/0266274 A1 * | 10/2009 | Berlin | A47B 23/046 108/6 |
| 2009/0307843 A1 * | 12/2009 | Hookway | A47B 23/046 5/425 |
| 2009/0320206 A1 * | 12/2009 | Dyreby | A47B 9/20 5/611 |
| 2011/0197796 A1 | 8/2011 | Bhave et al. | |
| 2011/0203496 A1 * | 8/2011 | Garneau | A47B 9/20 108/147 |
| 2012/0217103 A1 * | 8/2012 | Khuu | B60B 33/0068 188/69 |
| 2012/0312196 A1 * | 12/2012 | Newkirk | H02J 7/025 108/23 |
| 2013/0015300 A1 * | 1/2013 | Klinke | A61G 7/018 248/49 |
| 2013/0273133 A1 | 10/2013 | Eddy | |
| 2014/0096706 A1 * | 4/2014 | Labrosse | A47B 21/02 108/21 |
| 2014/0102340 A1 | 4/2014 | Kooistra et al. | |
| 2014/0137773 A1 * | 5/2014 | Mandel | G06Q 10/109 108/50.11 |
| 2014/0208986 A1 * | 7/2014 | DesRoches | A47B 9/20 108/22 |
| 2014/0324315 A1 * | 10/2014 | Brondum | B60B 33/0092 701/70 |
| 2014/0360412 A1 * | 12/2014 | Zaccai | A47B 88/0407 108/50.11 |
| 2015/0007756 A1 * | 1/2015 | Kollreider | A47B 9/04 108/21 |
| 2015/0285430 A1 * | 10/2015 | Wang | A47B 9/04 248/188.5 |

FOREIGN PATENT DOCUMENTS

| | | |
|---|---|---|
| JP | 2012139393 | 7/2012 |
| WO | 2011102961 | 8/2011 |

* cited by examiner

OVERBED TABLE

BACKGROUND OF THE INVENTION

This invention relates to apparatus for positioning a table or tray adjacent to and over a bed for use by a person in the bed that may be used in hospitals, institutions, homes and the like. The new overbed table has electronic devices, such as, motors, positioning devices, connectors and processors for a table and frame to allowing positioning and use of the table electronically, except for moving the overbed table structure to a bed.

Overbed tables may be known that are simple mechanically operated structures for raising and lowering a table member on a vertical support column, as well as, rotating the table member about the longitudinal axis of the support column. The table member may also be rotated about its longitudinal axis to be slanted relative to vertical for uses other than food or tray service, for example, for reading. These types of mechanical overbed tables may have a simple table positioned on a generally vertical column that is attached to a base support that may have beam members with casters or wheels at corners.

The mechanically operated overbed table apparatus may have bearings, latches, rollers and the like for positioning and ease of movement of rotating or linear positioning of members. There may also be hand or foot brakes and friction and latching devices to control the movement and positioning of the overbed table. These overbed table devices may difficult to operate by a person reclined in a bed and may require operation by a servicing person.

The mechanical operated overbed tables may have electrical systems that have power cords, solar cells and batteries; and processing units, table position detectors, and electronic connectors or ports to support electronic devices used on the table of the overbed table apparatus. There may also be overbed table apparatus that incorporate power assist devices to aid in vertical positioning of the table element above the base support member, such as, hydraulic or gas actuators, or electric motors with rack and pinion devices in telescoping vertical support columns.

There is a need for a more automated, light weight structure, simple overbed table apparatus to aid service persons for use with bedridden persons, for example, in hospitals. This would reduce the time spent in servicing bedridden persons and may further reduce service time if the bedridden person can make overbed table adjustments with a remote control device.

SUMMARY OF THE INVENTION

The present invention is directed to overbed table apparatus for positioning a table over a bed. An overbed table may have a base support frame with at least three casters and a rechargeable battery. A motor housing with a top wall having an opening may be attached to the base support and a telescoping column that is hollow tubular is attached at a bottom end to the motor housing over the opening to extend upwardly. A linear motor is positioned in the motor housing with a linear motor actuator projecting through the opening and into the telescoping housing wherein an extension member of the linear motor actuator is attached at a top end to a slidable table column member of the telescoping housing. Servo housing is attached at a top end of the slidable table column member with a servomechanism attached in the servo housing positioned for a rotating shaft of the servomechanism to engage a circular bracket attached adjacent to a first end of a table wherein the circular bracket is rotatably engaged with the servo housing. The rechargeable battery is in electrical communication with a control processor of a control panel attached adjacent the first end of the table, to the linear motor and to the servomechanism.

These and other features, aspects and advantages of the present invention will become better understood with reference to the following drawings, description and claims.

BRIEF DESCRIPTION OF THE DRAWINGS

FIG. 4A illustrates a partial view of an electronic control panel on the table of an overbed table according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
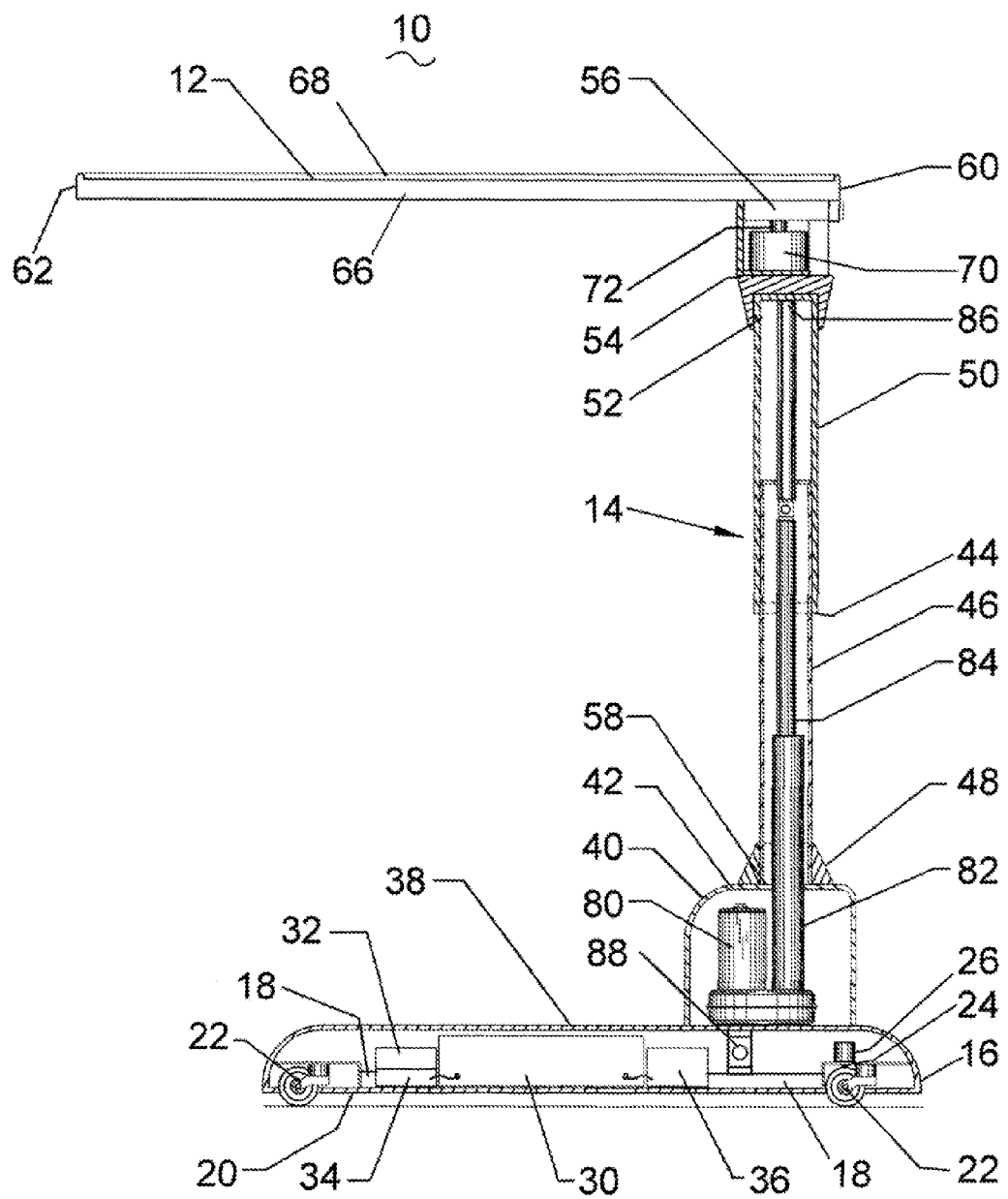
FIG. 1 illustrates a side elevation partial cross-sectional view of an overbed table with the table positioned over the base support according to an embodiment of the invention.
Figure 2:
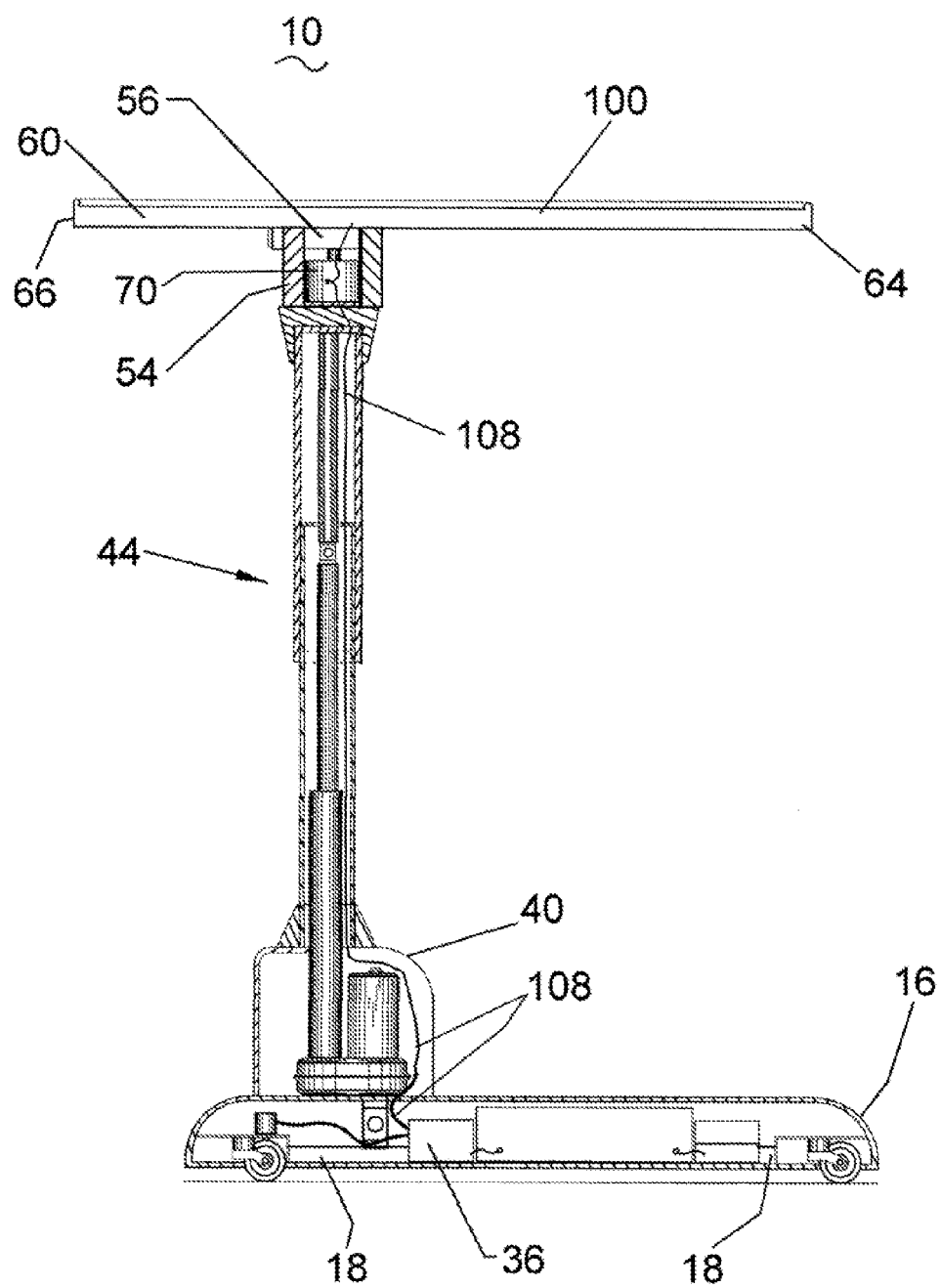
FIG. 2 illustrates a side elevation partial cross-sectional view of an overbed table with the table rotated 90 degrees from the longitudinal axis of the base support and support column according to an embodiment of the invention.
Figure 3:
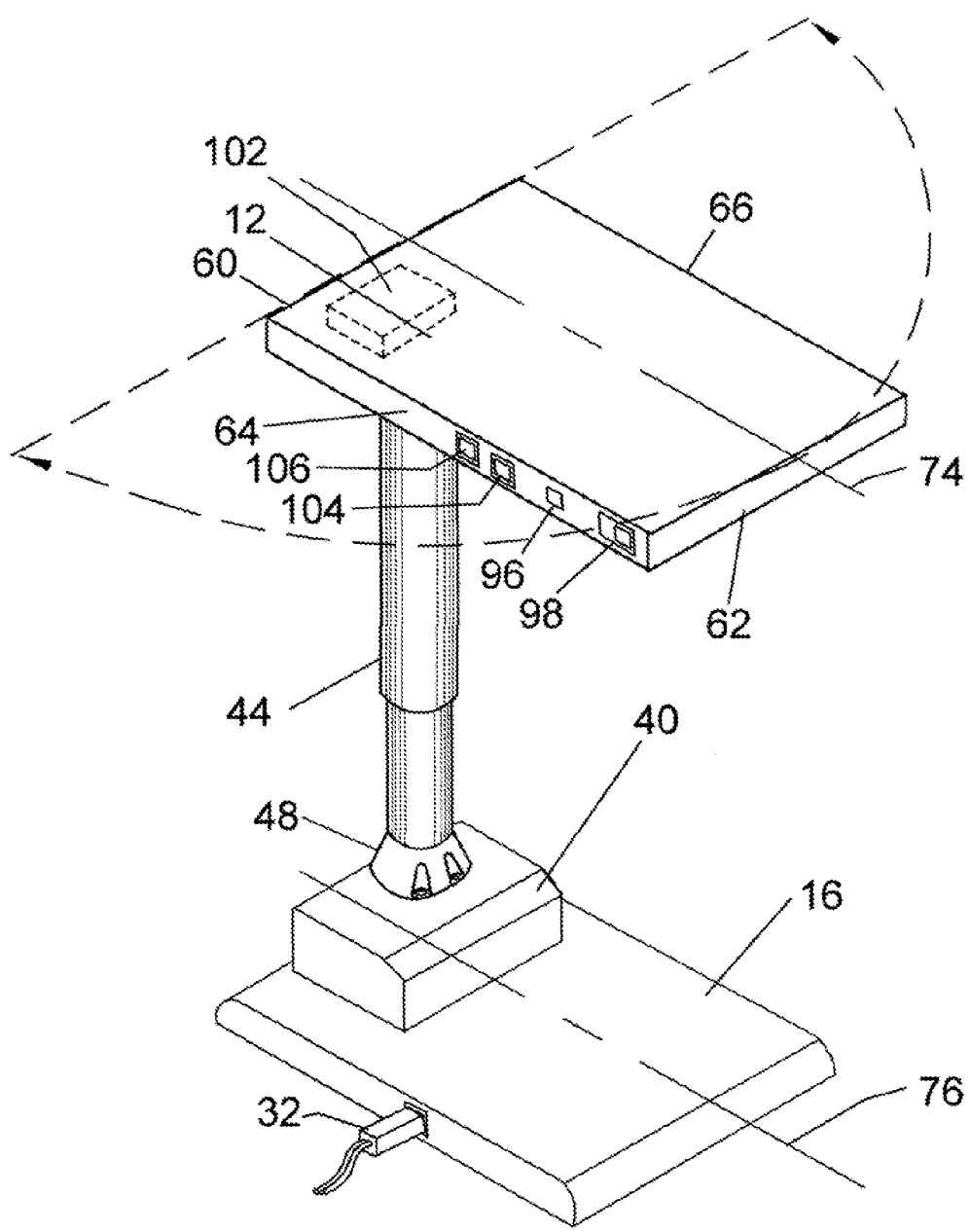
FIG. 3 illustrates a perspective view of an overbed table according to an embodiment of the invention.

Referring to FIGS. 1 through 3, an overbed table apparatus 10 has a table 12 member, a support column 14 that is generally vertical and that is attached to a base support 16. The base support 16 has a bottom frame 20 with at least three suspension casters 22 attached for the casters 22 positioned to roll on a generally horizontal surface, for example, a floor. Each caster 22 has a wheel lock 24 that is engaged and disengaged by an electronic solenoid 26.

The bottom frame 20 has a battery 30 that may be a 12 VDC, 8 amp-hour lithium ion battery for light weight, recharging, extended storage features. The battery 30 may be chargeable for 8 to 12 hours of power. A retractable power cord 32 may be attached to a 110/220 VAC to 12 VDC trickle charger 34 for use in charging the battery 30. There may also be a 12 VDC to 115 VAC inverter 36 to supply AC power for the overbed table 10.

The bottom frame 20 may be made of thermoplastic or other suitable high strength, light weight material. There may be an impact resistant housing 38 positioned over the bottom frame 20 and the devices attached to the bottom frame 20 for protection of the base support 16. The housing 38 may be ABS impact resistant. There may also be at least one base support beam 18.

A motor housing 40 is attached to the base housing 38 and a telescoping column 44 is attached to the top wall 42 of the motor housing 40. The telescoping column 44 has a base column member 46 attached at a bottom end 48 to the top wall 42 and is slidably engaged at its upper portion with a table column member 50. The top end 52 of the table column member 50 is attached to a servo housing 54 that is rotatably attached to a circular bracket 56 that is attached adjacent a first end 60 of the table 12.

The motor housing 40, telescoping column 44, and servo housing 54 are general hollow wall structures. The motor housing 40 has an opening 58 in the top wall 42 positioned for a linear motor 80 that is positioned in the motor housing 40 and attached to the base support 16 by a motor support bracket 88 to extend a linear motor actuator 82 device through the opening 58 into the telescoping column 44. The linear motor actuator 82 extension member 84 is attached at a top end 86 to the movable table column member 50 to raise and lower approximately 48 inches.

A rotatable electric motor or servomechanism 70 is attached in the servo housing 54 with a rotating shaft 72 attached to the circular bracket 56 of the table 12. The table 12 may then be rotated adjacent the first end 60 to move the table 12 about the rotating shaft 72 to move its longitudinal axis 74 approximately 90 degrees right or left relative to the longitudinal axis 76 of the base support 16, as best viewed in FIG. 3.

The top surface 68 of the table 12 may have an antibacterial surface material.

Figure 4:
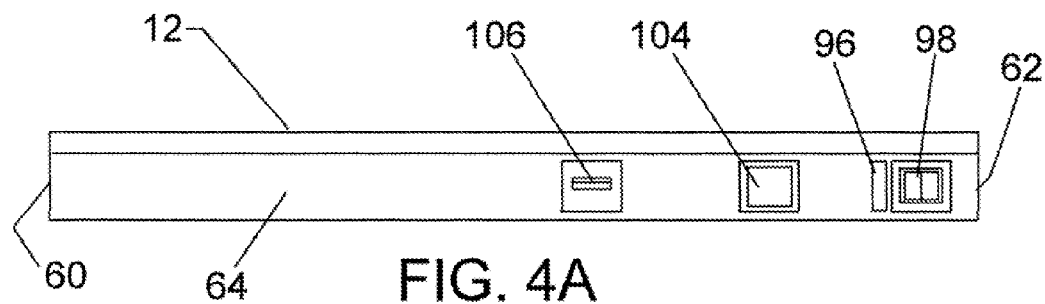
FIG. 4 illustrates a top plan view of an electronic remote control device for the overbed table according to an embodiment of the invention.
Figure 4:
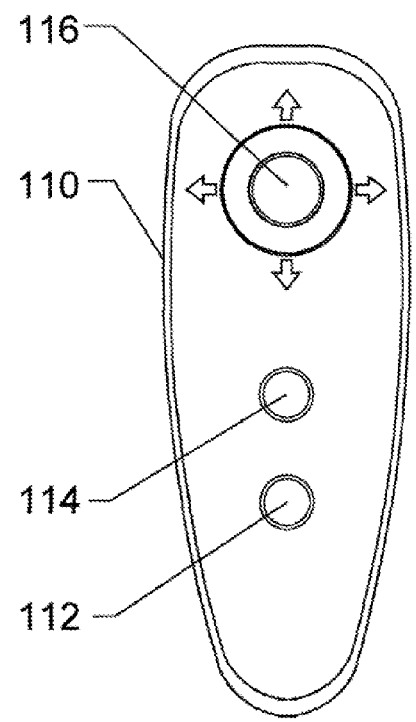

Referring to FIGS. 4 and 4A, there may be a control panel 100 with a control processor 102 that may be a PCB that is attached at the first end 60 of the table 12. There may also be a hand holdable controller 110 that is in wired or wireless communication with the control processor 102. The control panel 100 may have a power on-off switch 98, a battery power level indicator 96, and a wheel lock switch 104, and a table rotate and elevation control 106. The controls and switches 96, 98, 104, 106 may also be located on one of the sides 64, 66 of the table 12 adjacent the second end 62. The hand holdable controller 110 may also have a power control switch 112, a wheel lock switch 114, and a table rotate and elevation control 116. The communication of electric power and control signals may be by a power and control cable 108 or by wireless electronics (not shown).

The use of the automated, light weight, simple overbed table apparatus should reduce the time nurses and other care givers spend managing overbed tables for patients. This time spent is currently estimated as approximately 20 to 30 minutes. In addition a bedridden patient can adjust the overbed table themselves for various uses once the overbed table is positioned relative to the bed.

A linear motor actuator 82 with a screw drive, ball bearing rod and heavy duty 12 VDC motor 80 rated to lift 200 pounds provides a compact, effect elevation control device for the overbed table 10 operation. This in combination with a relatively flat 12 VDC gear motor 70 provide an efficient, electric power overbed table 10, without undue complexity, for persons reclined in a bed because of health issues. The actuator 82 and motor 70 are mass produced items, such as, for the automotive industry and can be purchased at very competitive prices.

While the invention has been particularly shown and described with respect to the illustrated embodiments thereof, it will be understood by those skilled in the art that the foregoing and other changes in form and details may be made therein without departing from the spirit and scope of the invention.

We claim:

1. An apparatus for positioning a table over a bed comprising:
   an overbed table with a base support frame with at least three casters and a rechargeable battery;
   a motor housing attached to a top surface of said base support frame and with a top wall having an opening therein and a telescoping column that is hollow tubular structure attached at a bottom end to said motor housing over said opening to extend upwardly;
   a linear motor disposed in said motor housing with a linear motor actuator projecting through said opening and into said telescoping column wherein an extension member of said linear motor actuator is attached at a top end to a slidable table column member of said telescoping column;
   a servo housing attached at a top end of said slidable table column member with a servomechanism attached in said servo housing disposed for a rotating shaft of said servomechanism to engage a circular bracket attached adjacent to a first end of said table wherein said circular bracket is rotatably engaged with said servo housing; and
   a control processor in electrical communication with a control panel, and each in communication with said linear motor actuator, said servomechanism and said rechargeable battery.

2. The apparatus as in claim 1 wherein at least one of said casters has a wheel lock that is controlled by an electronic solenoid in electrical communication with said control processor.

3. The apparatus as in claim 1 wherein said base support further comprises a bottom frame with at least one base support beam, and a housing.

4. The apparatus as in claim 1 wherein a retractable power cord is connected to a trickle charger that is connected to said rechargeable battery and an inverter is connected to said rechargeable battery.

5. The apparatus as in claim 1 wherein said control panel has a power on-off switch, a battery power level indicator, a wheel lock switch and a table rotation and elevation control.

6. The apparatus as in claim 1 wherein a second control panel is disposed in said table adjacent a second end of said table on one of a first side and a second side.

7. The apparatus as in claim 1 wherein a hand holdable controller is in communication with said control processor and said hand holdable controller has a power on-off switch, a wheel lock switch and a table rotation and elevation control.

8. The apparatus as in claim 1 wherein said table has an antibacterial surface material.

* * * * *